United States Patent
Glos, II

[11] 3,828,806
[45] Aug. 13, 1974

[54] TWO-WAY VALVE HAVING FREELY PIVOTABLE VALVE ELEMENT

[75] Inventor: Edmond A. Glos, II, Sarasota, Fla.

[73] Assignee: Davis Water & Waste Industries, Inc., Thomasville, Ga.

[22] Filed: June 15, 1972

[21] Appl. No.: 263,211

[52] U.S. Cl............... 137/111, 137/102, 137/192, 137/527.8
[51] Int. Cl...................... G05d 11/00, F16k 15/04
[58] Field of Search ........ 137/610, 611, 612, 612.1, 137/111, 102, 119, 122, 192, 41, 467.5, 433, 448, 449, 533, 533.11, 527, 527.8, 625.4, 602, 605, 519.5, 520; 251/302, 338, 298; 210/108, 119, 121

[56] References Cited
UNITED STATES PATENTS

| | | | |
|---|---|---|---|
| 265,310 | 10/1882 | Dyel | 137/527 X |
| 2,044,921 | 6/1936 | Swanland | 137/520 X |
| 2,789,575 | 4/1957 | Miller | 137/527.8 |
| 2,807,275 | 9/1957 | Steidley | 137/122 |
| 3,176,720 | 4/1965 | Donahue | 251/298 X |
| 3,509,900 | 5/1970 | Jull et al. | 137/533.11 X |

Primary Examiner—William R. Cline
Attorney, Agent, or Firm—Cushman, Darby & Cushman

[57] ABSTRACT

The invention is related to an automatic two-way valve especially useful with the discharge of sludge effluent from a tank, but having other uses. The valve has a dual purpose and function in that it can be responsive to two different conditions of the sludge effluent. In one particular use the valve includes a member having a predetermined specific gravity correlated to the density condition of the sludge so that variations in sludge density vary the buoyancy of the valve member to cause it to move between alternative flow controlling positions. In another particular use the valve member is responsive to the variations in conditions of sludge flow so as to cause it to also move between alternative flow controlling positions.

1 Claim, 4 Drawing Figures

TWO-WAY VALVE HAVING FREELY PIVOTABLE VALVE ELEMENT

BACKGROUND OF THE INVENTION

This invention relates to an automatic two-way valve which can be used for different purposes. Although the uses of the valve will be described with reference to controlling the flow of sewage effluent, it will be realized that the valve is susceptible of other uses.

In one use of the valve, it is installed in advance of a filter and will automatically open to discharge waste from a filter backwashing operation while at the same time close the intake or flow of effluent to the filter. When the backwashing operation ceases, the valve closes the waste discharge outlet and reopens the intake opening for effluent. In another use the valve is installed at the bottom of a tank wherein sewage effluent is being recirculated and the valve is connected so that recirculation takes place therethrough. In this arrangement when the specific gravity of the effluent exceeds a certain predetermined value, i.e., the effluent becomes more dense, the valve automatically opens an outlet to discharge effluent from the tank while at the same time closing the outlet of the recirculation passageway. When the specific gravity of the effluent drops below the predetermined value, the valve automatically closes the discharge outlet and reopens the outlet of the recirculation passageawy.

The structure of the value generally is the same for both uses and is adapted to either by its physical position in an installation.

DESCRIPTION OF THE PRIOR ART

In the prior art various valving arrangements have used an element that is responsive to the density of the fluid flowing through the valve. Exemplary of such devices is the parent to Boivin, U.S. Pat. No. 1,408,977. In the Boivin Patent there is a bulb which will rise and lower depending upon the density of the fluent material in the valve compartment. The bulb is attached to the valve so as to open and close the opening in response to movement of the bulb. These prior art devices, as exemplified by the Boivin Patent, suffer from the attendant drawback that they are more complicated than the instant invention, therefore giving rise to greater manufacturing, installation and replacement costs.

In the instant invention these drawbacks are reduced by a simple yet efficient device. The present invention improves the prior art, by making the density responsive element and the valve element one member, thereby reducing the necessity for two separate elements to accomplish the same function.

The prior art also discloses valving arrangements that utilize movable valve elements to control flow. Illustrative of these prior art inventions is the patent to Oxford, U.S. Pat. No. 1,721,353. In this patent a movable ball valve element is placed in a passageway to alternatively open and close it in response to fluid flow therethrough. However, the prior art is limited to a flow-responsive valve element that controls fluid through only one passageway opening.

In the instant invention, the valve overcomes this prior art limitation and is capable of establishing a plurality of flow paths. This is accomplished by having the condition-responsive valve element adapted to move between alternative positions, to thereby open and close various passageways in the valve.

SUMMARY OF THE INVENTION

It is therefore an object of the invention to provide a simple, inexpensive two-way valve which will automatically control the flow of sludge effluent.

Another object of the invention is to provide a simple, inexpensive automatic two-way valve that is condition-responsive.

A still further object of the invention is to provide the valve with a valve element responsive to density variations in the material controlled by the valve.

A still another object of the invention is to provide a valve with a valve element that is responsive to variations in fluid flow.

Other objects, advantages, and novel features of the invention will become apparent from the following detailed description of the invention when considered in conjunction with the accompanying drawings, in which:

DETAILED DESCRIPTION OF THE PREFERRED EMBODIMENT

Figure 1:
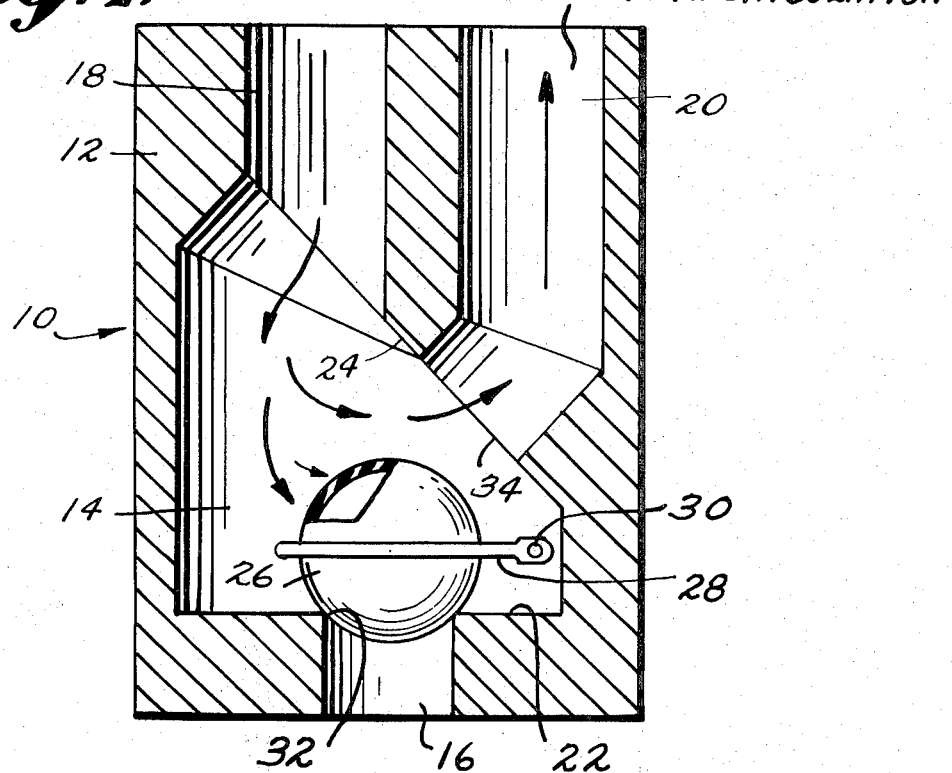
FIG. 1 is a sectional view of a valve embodying this invention arranged to be responsive to variations in densities of material controlled thereby and showing the valve in one flow-controlling position.
Figure 2:
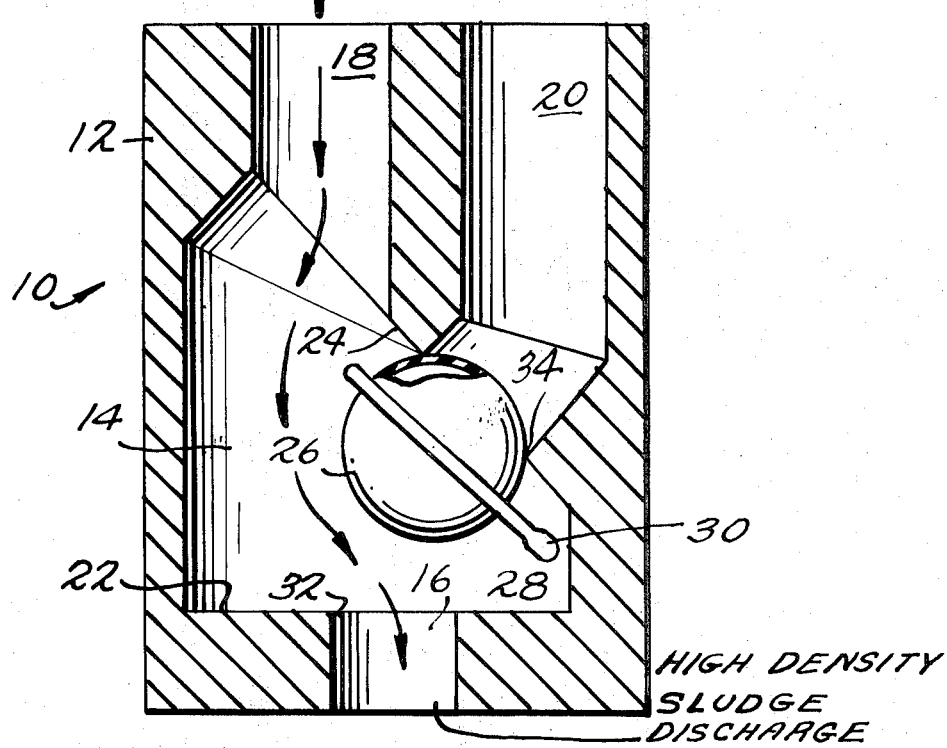
FIG. 2 is a view corresponding to FIG. 1, but showing the valve in another flow-controlling position.

Referring now to the drawings, there is shown in FIGS. 1 and 2 a valve 10 embodying this invention arranged to be responsive to variations in specific gravity or density of the material controlled thereby. For example, the valve 10 is arranged at the bottom of a tank (not shown) wherein sewage sludge is being recirculated, and is adapted to discharge sludge from the tank when the specific density or gravity of the sludge exceeds a predetermined value. The valve 10 has a casing 12 provided with an inner valve chamber 14 having three passageways 16, 18, 20 opening thereto. As shown, the valve chamber 14 is of generally right triangular configuration in cross section when the valve 10 is positioned for this function the chamber wall 22 corresponding to a side of the triangle is arranged generally horizontal at the bottom while the chamber wall 24 corresponding to the hypotenuse is inclined at the bottom and at the top. Two of the passageways 18 and 20 open to the chamber 14 through the inclined upper wall 24, while passageway 16 opens to the chamber 14 through the generally horizontal bottom wall 22.

Disposed in the valve chamber 14 is a ball valve element 26 made of neoprene or other suitable material and arranged so as to have a predetermined weight correlated to a predetermined density or specific gravity of the sludge controlled by the valve. The ball valve element 26 is mounted to move between two positions, one wherein it closes passageway 16 to flow from the chamber 14 and the other wherein it closes the passageway 20 to flow from the chamber. For this purpose, the valve may be attached to a diametric flapper member 28 which is pivotally mounted, in any appropriate manner, as at 30 to the casing 12. It will be noted that the path of movement of the valve element 26 between the aforedescribed two positions is generally vertical in FIGS. 1 and 2.

The valve 10 is connected so that passageway 18 serves as an inlet for sludge from the tank and the passageway 20 serves as an outlet for the sludge flowing back into the tank. The passageway is connected so that the sludge will be discharged through it. An appropriate recirculation pump (not shown) is connected between the tank and the passageway 18. The passageway 16 is connected to any appropriate discharge line (not shown).

In operation, when the specific gravity or density of the sludge entering the valve chamber 14 through the passageway 18 is below a predetermined value, the buoyancy of the ball valve element 26 is such that it sinks and seats in the opening 32 constituting the entrance to the passageway 16 from the valve chamber. In this position of the valve element 26, it will be seen that the passageway 20 is open to the chamber 14 so that sludge recirculates freely from the tank through the passageway 18, valve chamber 14 and passageway 20 back to the tank.

When the density or specific gravity of the sludge in the valve chamber 14 exceeds a predetermined value, however, correlated with the weight or specific gravity of the ball valve element 26, the latter will become sufficiently buoyant to rise off of the opening 32 to the discharge passageway 16 and allow discharge of sludge from the tank through the discharge line. At the same time, the ball valve element 26 will rise sufficiently to seat on the opening 34 to the recirculation discharge passageway 20 and stop flow therethrough. This condition will obtain as long as the specific gravity or density of the sludge flowing through the chamber 14 remains above the predetermined value. When it drops therebelow, the ball valve element 26 will lose sufficient buoyancy to sink and close the discharge passageway 16 while reopening the recirculation discharge passageway 20 so that recirculation of the sludge in the tank will resume.

Figure 3:
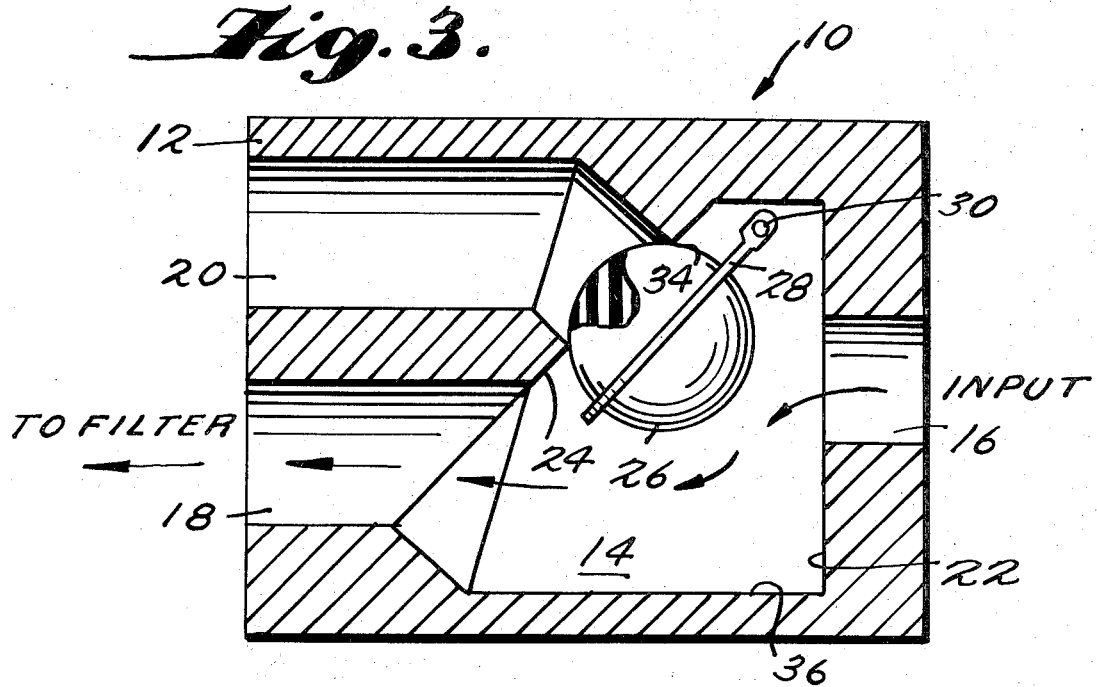
FIG. 3 is a view corresponding to FIG. 1 showing the valve arranged to be responsive to variations in flow of the material controlled thereby and showing the valve in one flow controlling-position.
Figure 4:
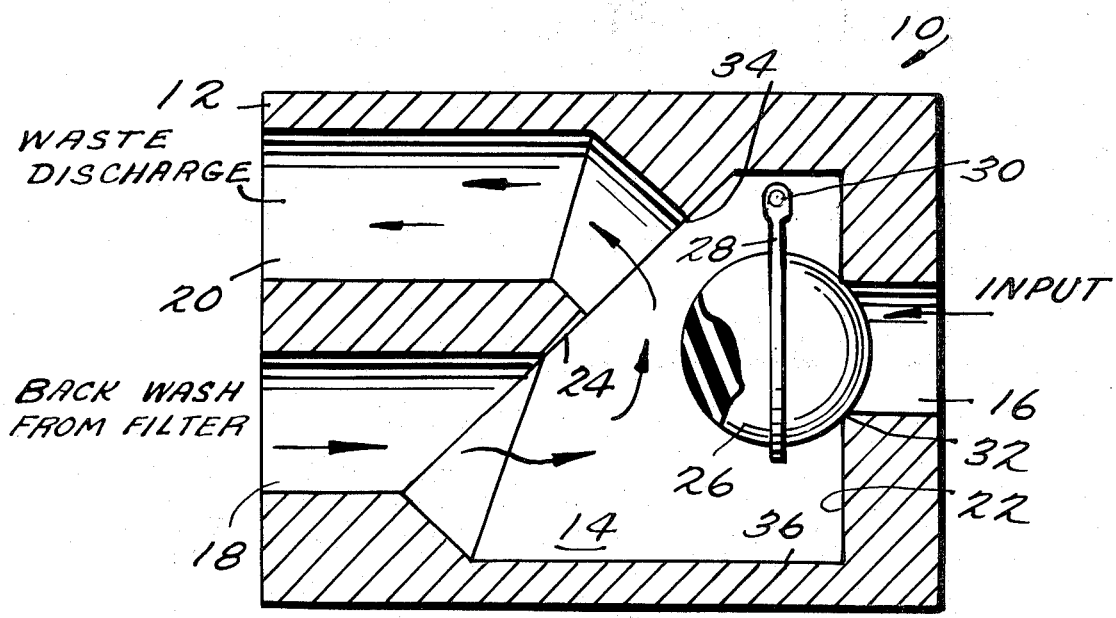
FIG. 4 is a view corresponding to FIG. 3 but showing the valve in another flow-controlling position.

Referring now to FIGS. 3 and 4, there is shown the automatic valve 10 embodying this invention arranged for use as an automatic bypass valve, for example, connected into a line (not shown), such as a sewage effluent line leading to the filter (not shown) and arranged to automatically discharge waste resulting from a filter backwashing operation while stopping the flow of effluent in the line.

For this purpose the valve is arranged in a position 90° removed from the position shown in FIGS. 1 and 2, and wherein the wall 22 is upright and the third wall 36 of the chamber 14 is horizontal. It will be noted that with the valve 10 in this position the path of movement of the ball valve element 26 will be substantially horizontal. The passageway 16 is connected to serve as an inlet for sewage effluent while the passageway 18 is connected to a filter. The passageway 20 is connected to any appropriate discharge for waste material resulting from a filter backwashing operation.

When sewage effluent is flowing into the passageway 16, the flow acting both on the valve element 26 and the flapper 28, will move the valve element to the left to the position shown in FIG. 3 wherein it closes the opening 34 to the discharge passageway 20. The valve element 26 normally is retained in this position by a combination of flow and pressure differential existing between the valve chamber 14 and the passageway 20.

As the filter slowly becomes clogged, it will be seen that flow through the chamber 14 will diminish. Sensing devices are employed in sewage treatment plants so that when this occurs a filter backwashing operation automatically takes place. This will result in almost complete cessation of flow through the valve chamber 14. The weight of the valve element 26 is such that at zero or low flow through the chamber 14 the pressure differential between the chamber and the discharge passageway 20 will be insufficient to hold the valve element on the outlet 34 to the discharge passageway. Accordingly, the valve element 20 will swing down and open the discharge passageway 20 so that waste from the backwashing operation will flow back through the passageway 18 and out through the discharge passageway 20. At the same time, it will be noted that the valve element 26 will close the inlet passageway 16 so as to prevent flow of waste thereinto.

This condition will obtain as long as the backwashing operation continues. When it ceases, flow will be reestablished from the inlet passageway 16 through the passageway 18 to the filter, and this will serve to move the valve element to its position closing the discharge passageway 20.

Without further analysis, the foregoing will so fully reveal the essence of the present invention that others can by applying current knowledge, readily adapt it for various applications without omitting features which fairly constitute essential characteristics of the generic and specific aspects of the contribution to the art and therefore, such adaptations should and are intended to be comprehended within the meaning and range of equivalence of the claims.

What is claimed as new and desired to be protected by letters Patent is set forth in the appended claims.

1. An automatic two-way valve for use in controlling liquid flow comprising: a valve casing having a valve chamber and three passageways terminating therein, a valve element mounted in said chamber for pivotal movement in a vertical plane about an axis disposed laterally of said element between a first position blocking flow from said chamber into a first of said passageways located below said element and a second position blocking flow from said chamber into a second of said passageways located above said element, all said passageways communicating with said chamber at locations such that said chamber contains a pool of liquid in which said element is immersed when said element blocks said first passageway and said second and third passageways communicating with said chamber at locations above said element, said element having a density such that an increase or decrease in the density of liquid in the pool of liquid in said chamber relative to a preselected value causes said valve element to move to its second and first positions, respectively, to thereby direct liquid entering said chamber from said third passageway to either said first or second passageway depending upon the density of the entering liquid.

* * * * *